United States Patent [19]

Mueller et al.

[11] Patent Number: 4,741,895
[45] Date of Patent: May 3, 1988

[54] PREPARATION OF CHROMIUM(III) OXIDE

[75] Inventors: Norbert Mueller, Friedelsheim; Bernhard Boettcher, Weisenheim; Manfred Ohlinger, Frankenthal; Helmut Reinicke, Gruenstadt; Gerhard Honecker, Ludwigshafen, all of Fed. Rep. of Germany

[73] Assignee: BASF Aktiengesellschaft, Ludwigshafen, Fed. Rep. of Germany

[21] Appl. No.: 920,058

[22] Filed: Oct. 17, 1986

[30] Foreign Application Priority Data

Mar. 25, 1986 [DE] Fed. Rep. of Germany ....... 3609971

[51] Int. Cl.⁴ .......................................... C01G 37/033
[52] U.S. Cl. ...................................................... 423/607
[58] Field of Search ........................................ 423/607

[56] References Cited

U.S. PATENT DOCUMENTS 3,278,263  10/1966  Cox .................................... 423/607
3,451,771   6/1969  Cox .................................... 423/607
3,696,039  10/1972  Rodi ................................. 252/62.51
4,040,860   8/1977  Mansmann et al. ................ 423/607
4,052,225  10/1977  Mansmann et al. ................ 423/607
4,235,862  11/1980  Rambold et al. ................... 423/607

FOREIGN PATENT DOCUMENTS 768724    6/1970  Belgium ............................ 423/607
0027640  10/1979  European Pat. Off. .
1106959   5/1969  Fed. Rep. of Germany .

OTHER PUBLICATIONS

Burkholz et al., Laser Diffraction Spectrometers/Experience in Particle Size Analysis, *Part. Charact.* 1 (1984), pp. 153–160.

Primary Examiner—Robert L. Stoll
Attorney, Agent, or Firm—Keil & Weinkauf

[57] ABSTRACT

A process for the preparation of chromium(III) oxide by decomposing hydrated ammonium dichromate at elevated temperatures, an apparatus for carrying out this process and the use of the chromium(III) oxide thus prepared as a starting material for the synthesis of chromium dioxide.

2 Claims, 1 Drawing Sheet

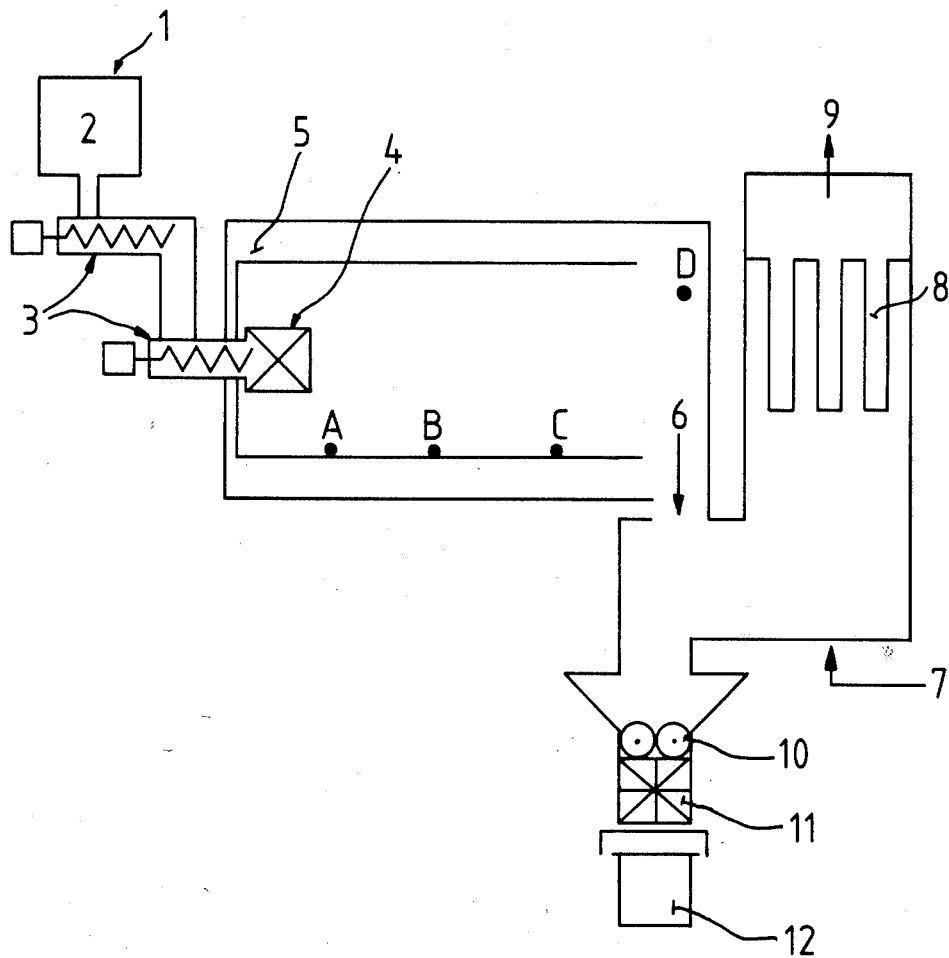

PREPARATION OF CHROMIUM(III) OXIDE

The present invention relates to a process for the preparation of chromium(III) oxide by decomposing hydrated ammonium dichromate at elevated temperatures, an apparatus for carrying out this process and the use of the resulting chromium(III) oxide as a starting material for the synthesis of chromium dioxide.

A number of processes are known in which, in order to prepare ferromagnetic chromium dioxide, chromium oxides or mixtures of chromium oxides having an average valence of not less than 4 are used as starting materials, and the process is carried out under superatmospheric pressure and at elevated temperatures in the presence of water and modifiers for improving the magnetic properties. For example, U.S. Pat. No. 3,278,263, described the preparation of chromium dioxide under hydrothermal conditions, using chromium(III) oxide and chromium(VI) oxide as starting materials. U.S. Pat. Nos. 3,451,771 and 3,696,039 describe similar processes. The chromium(III) oxide required for these syntheses is prepared by precipitating a chromium(III) oxide hydroxide, which is isolated either as such or after dehydration. The decomposition of dichromates and in particular the decomposition of ammonium dichromate, is also known. This reaction, in which the ammonium dichromate is decomposed into chromium(III) oxide, nitrogen and water, is exothermic, so that special precautions have to be taken during both storage and processing. Attempts have therefore long been made to use moist ammonium dichromate for the preparation of chromium(III) oxide. For example, the moist ammonium dichromate is introduced via a cooled screw into a continuous rotary tubular furnace, in which it decomposes by the reaction started by heating to about 600° C., without further heat being supplied, owing to the exothermic reaction. Although a chromium(III) oxide obtained in this manner is suitable for the synthesis of chromium dioxide, it is obtained as a very flocculent and inhomogeneous powder. Hence, only a low throughput can be achieved in the compacting procedure required for further processing, and the resulting powder is clearly inhomogeneous and moreover its agglomerates are difficult to separate in the slurry required for chromium dioxide synthesis. If the chromium oxide particles are not completely homogeneously dispersed in the reaction slurry which still contains chromic acid and dopants, the quality of the resulting chromium dioxide is affected.

It is an object of the present invention to provide a process which makes it possible to obtain a chromium(III) oxide which is substantially compact and has a uniform particle size spectrum.

We have found that this object is achieved and that, surprisingly, a chromium(III) oxide having the required properties can be obtained by decomposing hydrated ammonium dicarbonate at from 450° to 750° C. if the decomposition is carried out in a restricted combustion chamber which is such that the ratio of the volume of the combustion chamber in liters to the weight of ammonium dichromate throughput, in kg per minute, is from 1:1 to 6:1.

In an advantageous embodiment of the novel process, the hydrated ammonium dichromate is fed continuously to the combustion chamber and then allowed to undergo complete reaction in a furnace at a temperature below the decomposition temperature before being discharged from the furnace in a conventional manner. Advantageously, this is carried out in a furnace surrounding the combustion chamber.

For safety reasons, the ammonium dichromate used for the novel process has a water content of from 1 to 5% by weight. It is fed into the combustion chamber in a uniform stream via a metering apparatus. After a single necessary ignition by heating to more than 200° C., the exothermic reaction takes place in the restricted combustion chamber. It is advantageous if the combustion chamber is arranged in a conventional rotary tubular furnace in such a way that the decomposition product, which substantially consists of chromium(III) oxide, falls into the surrounding furnace, so that any residual starting material can react to completion at above the decomposition temperature, e.g. 520°–570° C., before the chromium(III) oxide is discharged, cooled with a counterclockwise stream of air and separated from the gaseous decomposition products, nitrogen and stream, by deposition on filters. This is followed by the conventional compacting procedure and, if necessary, milling of the chromium(III) oxide shells.

The chromium(III) oxide prepared by the novel process differs from that produced in a conventional manner in a large-volume decomposition furnace with its small charge capacity in that it is coarser and hence easier to compact, with the result that the throughput for a given production unit can be increased considerably. Although the chromium(III) oxide obtained directly by the process according to the invention has a higher content of coarse agglomerates, determined by sieve analysis, than a chromium(III) oxide obtained by the prior art method, this product is easier to divide up and furthermore has finer particles after the agglomerates have been separated. For example, 50% of the agglomerates are from 20 to 35 $\mu$m in size in a chromium(III) oxide obtained by the prior art method in a large-volume decomposition furnace, 50% of the agglomerates in a product obtained according to the invention are from 50 to 150 $\mu$m in size. However, if the agglomerates are divided up simply by gentle stirring in aqueous suspension, 50% of the remaining agglomerates are 6 $\mu$m or larger in the product obtained according to the invention, whereas 50% are 11 $\mu$m or larger in the prior art product, i.e. are virtually twice as large. Although this information is only given by way of example to demonstrate the advantageous properties of the chromium(III) oxide obtainable by the novel process, it is in general true that the products thus obtained are more compact, more homogeneous and more finely divided and their agglomerates can be very easily separated.

The fact that the chromium(III) oxide prepared by the novel process can readily be comminuted constitutes a particular advantage when it is used to prepare chromium dioxide. Chromium dioxide is prepared in a conventional manner by preparing a slurry of chromic acid, chromium(III) oxide, dopants and water, which is then heated to 200°–600° C. under from 100 to 700 bar in a reactor, chromium dioxide being formed. Because the chromium(III) oxide prepared by the novel process can be divided up more easily, a more homogeneous slurry is obtained under otherwise identical dispersing conditions, resulting in a narrower particle size spectrum of the chromium dioxide. Chromium dioxide improved in this manner can be used to obtain magnetic recording media which are distinguished by improved signal to print-through ratio and a high signal/noise ratio coupled with otherwise identical electroacoustic characteristics.

The present invention furthermore relates to an apparatus for carrying out the process. Based on the known procedure for decomposing ammonium dichromate in a rotary tubular furnace, the novel process is carried out in a restricted combustion chamber. In the novel process, the volume of this combustion chamber without the feed apparatus (in liters) depends on the throughput of ammonium dichromate (in kg per minute), the ratio being from 1:1 to 6:1. In the apparatus for carrying out the novel process, the ratio of the diameter of this combustion chamber to its length is from 1:2 to 2:1. In an advantageous embodiment of the apparatus according to the invention, this combustion chamber is tubular. If the advantageous embodiment of the novel process is employed, the apparatus according to the invention is designed so that the combustion chamber is incorporated in a furnace which surrounds the combustion chamber, the ratio of the diameter ($d_1$) of the combustion chamber to the diameter ($d_2$) of the furnace being from 1:4 to 3:4. This furnace is connected to the conventional isolation and processing apparatuses.

The novel apparatus, together with the convential feed and discharge apparatuses, is shown schematically in the FIGURE, by way of example.

The hydrated ammonium dichromate 2 the stock vessel 1 via metering means 3 to the combustion chamber 4, in which decomposition takes place. This combustion chamber is located at the center of the beginning of the rotary tubular furnace 5. The chromium(III) oxide formed during the decomposition reaction falls into this furnace and is discharged from the furnace at 6, together with the nitrogen and steam formed. The waste gases and the entrained chromium(III) oxide are cooled by the stream of air blown in at 7, the solid is deposited on filter 8 and the waste gas escapes at 9. The material deposited on the filters, together with the solid obtained directly at 6, is compacted in compacting plant 10, milled in mill 11 and introduced into the stock vessel 12. Measuring points A to D are present in the rotary tubular furnace in order to monitor the temperature variation.

Examples and comparative experiments illustrate the novel process and the appropriate apparatus and describe the properties of the end product obtained in each case, in relation to the synthesis of chromium dioxide.

COMPARATIVE EXPERIMENT 1

The prior art method was used, and ammonium dichromate containing 1.5% of water was introduced at a rate of 169 kg/h, via a cooled screw, into a continuously operated rotary tubular furnace which had a length of 3 m and a diameter of 80 cm. After the reaction had been started by heating the furnace to about 600° C., the exothermic reaction continued without a supply of heat, and the following product temperatures were established over the length of the furnace: measuring point A 690° C., measuring point B 540° C., measuring point C 450° C. and waste gas temperature, measuring point D 200° C. The $Cr_2O_3$ was cooled to below 100° C. with a countercurrent stream of air, and was compacted and then milled. The product prepared in this manner was difficult to compact and permitted only a low throughput (<100 kg/h) in the compacting procedure. The following parameters were determined for the resulting product, these parameters being given in Table 1:

1. Tap density

The tap density $\rho[g/cm^3]$ was determined according to DIN 53,194.

2. Specific surface area

The specific surface area SSA $[m^2/g]$ was determined according to DIN 66,123, using a Strohlein areameter (Ströhlein, Düsseldorf, FRG) and the single-point differece method due to Haul and Dümbgen.

3. Sieve analysis

Sieve analysis was carried out according to DIN 53,734, using an air jet sieve.

4. Cilas

The particle agglomerates distribution was determined according to A. Bürkholz and R. Pohlke, Laser diffraction Spectrometer Experience and Particle Size Analysis, in Particle Characterizations, No. 1, 1984, pages 153–160.

EXAMPLE 1

In the rotary tubular furnace used in the comparative experiment, a tube having a length of 38 cm and a diameter of 30 cm and incorporating a transport screw was mounted concentrically at the charging orifice of the furnace. Decomposition of the ammonium dichromate took place in this tubular combustion chamber. The temperature distribution at measuring points A to C in the rotary tubular furnace ranges from 540° to 560° C., while the liquid gas temperature (measuring point D) was 250° C. By installing this combustion chamber, it was possible to increase the throughput in the compacting stage to 200 kg/h and moreover to vary the tap density from 0.6 to 1.0 g/cm³. The results of the measurement on the chromium(III) oxide obtained are shown in Table 1.

TABLE 1

| | $\rho$ [g/cm³] | SSA [m²/g] | Sieve analysis [μm] | | | Cilas in [μm] | | |
|---|---|---|---|---|---|---|---|---|
| | | | >500 | 100–500 | <100 | >20 | 1–20 | <1 |
| Example 1 | 0.79 | 44.1 | 15% | 30% | 55% | 22% | 64% | 12% |
| Example 1 | 0.83 | 43.9 | 23% | 35% | 38% | 15% | 69% | 16% |
| Comparative Experiment 1 | 0.75 | 43.9 | 0% | 15% | 85% | 32% | 57% | 10% |

EXAMPLE 2

A. In a dispersing kettle, 136 kg of $CrO_3$ in 52 liters of water were taken, 60% of the $CrO_3$ was dissolved and the remainder was milled together with 0.15% by weight of $Sb_2O_3$ and 1.3% by weight of $Fe_2O_3$ (based in each case on the resulting $CrO_2$) to a particle size of less than 0.1 mm. 68 kg of a $Cr_2O_3$ [0.79 g/cm³] prepared as described in Example 1 were then added and mixed to give a homogeneous paste in the course of 20 minutes with thorough stirring. This paste was then introduced into an autoclave and the $CrO_2$ was synthesized, these steps being carried out as described in Example 1 of EP-B 27640.

On the resulting chromium dioxide, the magnetic properties were determined by means of a vibrating sample magnetometer in a magnetic field of 160 kA/m for a means sample density $\rho$ in [g/cm$^3$], the particular properties determined being the coercive force H$_c$ in [kA/m], the specific remanence M$_r$/$\rho$ and the specific saturation magnetization M$_s$/$\rho$ in [nTm$^3$/g].

The measured values are shown in Table 2.

B. 115 parts of a chromium dioxide prepared as described in Example 2, 2 parts of zinc stearate, 1.5 parts of soybean lecithin, 3 parts of a mixture of liquid fatty acids having a melting point of from 50° to 59° C., 110 parts of a mixture of equal amounts of tetrahydrofuran and 1,4-dioxane and 200 parts of a 15% strength binder solution, prepared by dissolving 19.5 parts of an elastomeric, thermoplastic polyurethane (obtained according to German Published Application DAS No. 1,106,959 from adipic acid, butane-1,4-diol and 4,4′-diphenylisocyanatodiphenylmethane) and 10.5 parts of a vinyl chloride polymer obtained from 80 parts of vinyl chloride and 10 parts of dimethyl maleate in 170 parts of a mixture of equal amounts of tetrahydrofuran and 1,4-dioxane, were introduced into a cylindrical steel mill having a capacity of 1000 parts by volume and containing 1000 parts of steel balls having a diameter of 4 to 7 mm. The mixture was dispersed for 5 days and the resulting dispersion was filtered under pressure through a glass fiber-paper filter layer and applied on a conventional coating machine by means of a knife coater onto a 12 $\mu$m thick polyethylene terephthalate film in a thickness such that, after drying and calendering, a dry layer about 4.5 $\mu$m thick was obtained. Directly after the liquid dispersion had been cast, the acicular chromium dioxide particles were oriented along the recording direction by means of a magnetic field. The surface of the magnetic layer had an average peak-to-valley height Rz of from 0.08 to 0.10 $\mu$m, measured according to DIN 4756, sheet 1, section 2.3.3. The coated film was slit into 3.81 mm wide magnetic tapes and tested as follows:

Magnetic properties

The magnetic properties of the resulting magnetic tapes were determined using a vibrating sample magnetometer in a magnetic field of 160 kA/m. The coercive force Hc in [kA/m], the residual induction Mr and the saturation magnetization M$_s$ in [mT] were measured, and the orientation ratio Rf was calculated as the quotient of the residual induction along the preferred magnetic direction to that in the crosswise direction.

Electroacoustic properties

The electroacoustic tape data were measured according to DIN 45,512, sheet II, against reference tape 54592 A (=0 dB). The maximum output level A$_T$ at 1 kHz and A$_H$ at 10 kHz, the sensitivity E$_T$ at 1 kHz and E$_H$ at 10 kHz, the signal-to-bias noise ratio at rest RG$_o$ and the signal to print-through ratio Ko were measured.

The results of the measurements are shown in Table 2.

EXAMPLE 3

Example 2 was repeated using a chromium(III) oxide (0.83 g/cm$^3$) prepared as described in Example 1. The results of the measurements are shown in Table 2.

COMPARATIVE EXPERIMENT 2

A chromium(III) oxide prepared according to Comparative Experiment 1 was processed as described in Example 2. The results of the measurements are shown in Table 2.

TABLE 2

|  | Examples | | Comparative Experiment 2 |
|---|---|---|---|
|  | 2 | 3 |  |
| CrO$_2$ powder: | | | |
| SSA [m$^2$/g] | 27.8 | 27.4 | 28.2 |
| $\rho$[g/cm$^3$] | 1.36 | 1.34 | 1.35 |
| H$_c$ [kA/m] | 48.3 | 49 | 49.7 |
| Mr/$\rho$ [nTm$^3$/g] | 43.7 | 43.7 | 44 |
| M$_m$/$\rho$ [nTm$^3$/g] | 76.8 | 76.9 | 77.2 |
| CrO$_2$ tape: | | | |
| d [$\mu$m] | 4.5 | 4.9 | 4.8 |
| H$_c$ [mkA/m] | 48.7 | 49.2 | 49.8 |
| M$_r$ [mT] | 176 | 173 | 167 |
| M$_m$ [mT] | 200 | 196 | 188 |
| R$_f$ | 2.75 | 2.81 | 2.83 |
| A$_T$ [dB] | 0.2 | 0.4 | −0.2 |
| A$_H$ [dB] | 4.5 | 4.5 | 4.0 |
| E$_T$ [dB] | −0.6 | −0.7 | −0.5 |
| E$_H$ [dB] | 3.5 | 3.5 | 3.0 |
| RG$_o$ [dB] | 1.5 | 1.7 | 1.2 |
| K$_o$ [dB] | 57 | 56 | 54 |

We claim:

1. A process for the preparation of chromium(III) oxide by decomposing hydrated ammonium dichromate at from 450° to 750° C., wherein the decomposition is carried out in a combustion chamber which is such that the ratio of the volume of the combustion chamber in liters to the weight of ammonium dichromate throughput, in kg per minute, is from 1:1 to 6:1.

2. The process of claim 1, wherein the hydrated ammonium dichromate is fed continuously into the combustion chamber which is arranged within a rotary tubular furnace, and the decomposition product falls out of the combustion chamber into the surrounding furnace, said product thereupon being cooled with a countercurrent stream of air and separated from gaseous decomposition products.

* * * * *